Patented Nov. 20, 1951

2,576,076

UNITED STATES PATENT OFFICE 2,576,076

COPOLYMERS OF UNSATURATED NITRILES

Marguerite Naps, Oakland, and Fred E. Condo, El Cerrito, Calif., assignors to Shell Development Company, San Francisco, Calif., a corporation of Delaware No Drawing. Application July 3, 1948, Serial No. 37,064

8 Claims. (Cl. 260—85.5)

1

This invention relates to a new class of copolymers. More particularly the invention relates to a novel group of copolymers produced from the alpha-substituted, alpha,beta-unsaturated nitriles.

More specifically the invention provides a new and particularly useful class of copolymers which are prepared by copolymerizing alpha-substituted, alpha,beta-unsaturated nitriles with certain quantities of an alpha-alkyl substituted styrene, preferably alpha-methyl styrene. The resins obtained from the novel copolymers are characterized by the fact that while they are classified as thermoplastic resins they possess many of the characteristics of both the thermoplastic resins and the thermosetting resins and are thus able to be utilized for industrial purposes for which many of the known thermoplastic resins and thermosetting resins by themselves are entirely unsuited.

There are two general classes of resins in use in industry, the thermoplastic resins and the thermosetting resins. The thermoplastic resins possess many desired properties but they possess the unfavorable characteristic of becoming soft and losing their shape when exposed to relatively high temperatures, i. e. they possess a low heat-distortion point. The thermosetting resins on the other hand possess many of the properties lacking in the thermoplastic resins, such as a high heat-distortion point, but they in turn lack many of the superior properties of the thermoplastic resins. Industry is, therefore, in need of a relatively inexpensive resin which embraces many of the ideal properties of both the thermoplastic resins and the thermosetting resins, e. g. a thermoplastic resin which possesses the hardness and high heat resistance of the thermosetting resins.

It is an object of the invention, therefore, to provide a new class of resins which possess many of the ideal properties of the thermoplastic resins and at the same time possess many of the ideal properties of the thermosetting resins. It is a further object of the invention to provide a new class of thermoplastic resins which possess a relatively high heat resistance, i. e. high heat distortion point, and increased degree of hardness. It is a further object of the invention to provide novel copolymers of the alpha-substituted, alpha,beta-unsaturated nitriles which form resins possessing a high heat distortion point and improved color. It is a further object of the invention to provide novel resins of the alpha-substituted, alpha,beta-unsaturated nitriles which may be produced in a very economical and practical manner and may be utilized for a great many industrial purposes

2 for which many of the known unsaturated nitrile resins are entirely unsuited. It is a further object of the invention to provide novel resins of methacrylonitrile which possess a high heat resistance. Other objects will be apparent from the detailed description of the invention given hereinafter.

It has now been discovered that these and other objects may be accomplished by copolymerizing the alpha-substituted, alpha,beta-unsaturated nitriles with certain quantities of an alpha-alkyl substituted styrene, preferably alpha-methyl styrene. The resins obtained from the copolymers produced by this process possess many of the ideal characteristics of the thermoplastic resins and at the same time possess a very high heat distortion point and high degree of hardness which are characteristic of the thermosetting resins. With such an excellent combination of properties the resins of the novel copolymers are able to be used for many purposes for which the known thermoplastic resins and thermosetting resins by themselves are entirely unsuited.

The production of resins from these two components which possessed the above-described combination of properties was highly unexpected in view of the fact that the resins resulting from the copolymerization of unsaturated nitriles with styrene display properties which are in some cases inferior to the properties of both the thermoplastic and thermosetting resins. In addition, prior to this time, it has been considered difficult if not impossible to copolymerize the alpha-alkyl substituted styrenes, such as alpha-methyl styrene, with many of the known polymerizable compounds.

The alpha-substituted, alpha,beta-unsaturated nitriles to be utilized in the production of the novel copolymers of the invention are those nitriles possessing at least one unsaturated linkage between two carbon atoms of aliphatic character, one of the said carbon atoms of the unsaturated linkage being attached directly to the nitrile group and to an open-chain alkyl radical or substituted alkyl hydrocarbon radical. The alpha-substituted, alpha,beta-unsaturated nitriles may be represented by the following general formula:

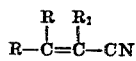

wherein $R_1$ is a member of the group comprising alkyl radicals and substituted alkyl radicals, and each R is a member of the group comprising a hydrogen atom, a halogen atom, a hydrocarbon radical or substituted hydrocarbon radical.

The alkyl radicals which $R_1$ may represent in the above-described formula may be any of the lower alkyl radicals, such as methyl, ethyl, propyl, isopropyl, butyl and the like.

The substituted alkyl radicals which $R_1$ may represent are the same as those alkyl radicals described above wherein at least one of the hydrogen atoms has been replaced by a non-interfering substituent, such as the halogen atoms, carboxyl radicals, and the like. Examples of the substituted open-chain hydrocarbon radicals are 2-chloropropyl, 4-bromo-2-butyl, 3-acetoxy-propyl, and the like.

The hydrocarbon radicals which R may represent in the above-described formula may be cyclic or acyclic, saturated or unsaturated. Examples of these hydrocarbon radicals are ethyl, propyl, isopropyl, butyl, propenyl, butenyl, pentenyl, isopentyl, hexenyl, cyclopentyl and the like. The substituted hydrocarbon radicals which R may represent are the same as the above-noted hydrocarbon radicals wherein at least one of the hydrogen atoms has been replaced by a non-interfering substituent, such as the halogen atoms, carboxyl radicals and the like.

Examples of the alpha-substituted, alpha,beta-unsaturated nitriles which may be used in the production of the novel copolymers of the invention are:

Methacrylonitrile
Alpha-ethyl acrylonitrile
Alpha-propyl acrylonitrile
2-butyl 2-hexenenitrile
2-propyl 2-pentenenitrile
2-chloroethyl 2-butenenitrile
2-ethyl 3-chloro 2-butenenitrile
2-isopropyl 3-bromo 2-pentenenitrile
Alpha-isopropyl beta-cyclohexyl acrylonitrile A group of the above-described alpha-substituted, alpha,beta-unsaturated nitriles which are particularly preferred in the formation of the novel copolymers of the invention are those of the above-described formula wherein $R_1$ is an alkyl radical containing from 1 to 3 carbon atoms and each R is a member of the group comprising the hydrogen atom and alkyl radicals containing from 1 to 3 carbon atoms. Examples of this particularly preferred group of the alpha-substituted, alpha,beta-unsaturated nitriles are:

Methacrylonitrile
Alpha-ethyl acrylonitrile
Alpha-isopropyl acrylonitrile
2-isopropyl 2-pentenenitrile
2-propyl 2-hexenenitrile
2-ethyl 5-methyl 2-hexenenitrile The alpha-alkyl substituted styrenes to be copolymerized with the above-described unsaturated nitriles may be any of the styrene compounds wherein the hydrogen atom on the alpha carbon atom of the side chain has been replaced by a lower alkyl radical containing from 1 to 3 carbon atoms, such as methyl, ethyl, propyl, isopropyl, and the like. The hydrogen atoms on the nuclear carbon atoms of the styrene molecule may be replaced if desired by other non-interfering substituents, such as halogen atoms, or short-chain aliphatic hydrocarbon radicals containing from 1 to 4 carbon atoms, such as ethyl, propenyl, methyl, butyl and the like. Examples of the alpha-alkyl substituted styrenes which may be used in the copolymerization reaction includes alpha-methylstyrene, alpha-ethyl styrene, alpha-methyl 4-chloro styrene, alpha-propyl 2,5-dimethyl styrene, alpha-methyl 4-isopropyl styrene. Alpha-methylstyrene, however, is by far the more preferred alpha-alkyl substituted styrene to be used for the copolymerization.

In the production of the novel copolymers a single alpha-substituted, alpha,beta unsaturated nitrile may be copolymerized with a single alpha-alkyl substituted styrene or a mixture of one or both of the components may be copolymerized together. Thus, for example, methacrylonitrile may be copolymerized with alpha-methylstyrene a mixture of alpha-ethyl acrylonitrile and methacrylonitrile may be copolymerized with alpha-methylstyrene or methacrylonitrile may be copolymerized with a mixture of alpha-methylstyrene and alpha-ethyl styrene.

The alpha-substituted, alpha,beta unsaturated nitriles and the alpha-alkyl substituted styrenes may be copolymerized in the presence of already-formed plastics, including natural resins, cellulose derivatives, synthetic resins, etc. Other modifiers, including plasticizers, stabilizers, lubricants, dyes, pigments and fillers may be added during the polymerization process provided they do not chemically react with or otherwise adversely affect the ingredients of the reaction mixture, otherwise, these modifiers may be added following polymerization. Examples of modifying agents and pigments that may be added are wood flour, wood fiber, paper dust, clay, glass wool mica, granite dust, silk flock, cotton flock, steel wool, cloth, sand, titanium oxide, lead oxide, chrome yellow, gums, oils, wax, and the like.

The alpha-substituted alpha,beta unsaturated nitriles and the alpha-alkyl substituted styrenes may be copolymerized in bulk in the presence or absence of a solvent or diluent or mixtures thereof. If a solvent is used the substance may be a solvent for the reactants and polymer, or may be a solvent for the reactants and non-solvent for the polymer. Emulsifying, granulating and wetting agents may also be present. It is also possible to effect polymerization by atomizing the reactants or solution thereof in the form of a fine spray into a heated chamber containing an inert gas. It is likewise feasible to polymerize the unsaturated nitriles and the alpha-methyl styrenes when they are dispersed in the interstices of fibrous material such as a fabric.

The proportions of the two components to be used in producing the novel copolymers should vary within certain limits in order to produce copolymers possessing the above-described properties. Copolymers possessing the desired properties are obtained when the quantity of the alpha-alkyl substituted styrene is maintained between about 10% and about 40% and the quantity of the alpha-substituted, alpha,beta-unsaturated nitrile is maintained between about 90% and 60% by weight of total reactants. Amounts of the alpha-alkyl substituted styrene around 40% or slightly higher could be used but such quantities are not usually desirable due to the difficulty with which the large amounts of the substituted styrene undergo polymerization. The maximum display of the above-described properties is obtained, however, when the amount of the alpha-alkyl substituted styrene is maintained between about 10% and 30% and the quantity of the alpha-substituted alpha,beta-unsaturated nitrile is maintained between 90% and 70% by weight of the total reactants and these are the preferred proportions to be used in the polymerization.

The polymerization is energized by the application of heat and/or light in the presence of a polymerization catalyst. When heat is to be applied temperatures between about 30° C. and about 150° C. are usually sufficient. A preferred temperature range lies between about 40° C. to about 80° C.

Catalysts that may be utilized in the polymerization includes the per-acid catalysts, such as persulfuric acid, peracetic acid, and perphthalic acid, the per-salt catalysts such as potassium persulfate, the peroxide catalysts, such as hydrogen peroxide, benzoyl peroxide, acetyl peroxide, benzoyl acetyl peroxide, lauryl peroxide, succinyl peroxide, sodium peroxide, barium peroxide, tert-alkyl hydroperoxides such as tert-butyl hydroperoxide. If desired, mixtures of the polymerization catalysts may be employed.

The amount of the catalyst employed may vary over a considerable range depending upon the various conditions of the reaction. In most cases the amount of the catalyst will vary between about .01% to about 2% by weight of the material to be polymerized. A preferred amount of catalyst will vary between about .01% to about 1% by weight of material being polymerized.

Atmospheric, reduced, or superatmospheric pressures may be used in the polymerization process. In those cases where the polymerization is maintained above the boiling point of the polymerizable mixture increased pressures may be maintained to prevent the boiling away of the components.

The polymerization reaction can be carried to completion without substantial interruption or it may be stopped at any point short of completion. Incomplete polymerization may be used for the production of syrup which may be further worked and eventually substantially completely polymerized. The syrup for instance, may be transferred to a mold of any desired configuration and again subjected to polymerization conditions, or it may be used in coating operations, or in impregnating bibulous, e. g. fibrous material which in turn may be used in the production of laminates. Unreacted polymerizable material may be separated from the polymer by any suitable method, such as filtration, extraction, distillation and the like.

The polymerization may be accomplished in any suitable type of apparatus and may be conducted in a batch, semi-continuous and continuous manner.

A particularly preferred method for the copolymerization of the unsaturated nitriles with the alpha-substituted styrenes comprises an aqueous emulsion polymerization process. In this preferred process the desired mixture of the unsaturated nitriles and the alpha-alkyl substituted styrenes are added to an aqueous emulsion comprising water, an emulsifying agent and the desired polymerization catalyst and the resulting mixture is subjected to polymerization conditions.

Emulsifying agents that may be employed in the preferred polymerization procedure includes the soaps, such as sodium and potassium myristate, laurate, palmitate, oleate, stearate, rosinate and hydroabietate; alkali metal alkyl or alkylene sulfates or sulfonates, such as sodium and potassium lauryl sulfate, cetyl sulfate, oleyl sulfonate, stearyl sulfonate, sulfonated castor oil as well as ammonium salts thereof; salts of higher amines like lauryl amine hydrochloride, and stearyl amine hydrobromide; and high molecular weight material, such as sodium polyacrylate, methyl-cellulose, hydroxy ethyl cellulose and polyvinyl chloride.

The amount of the emulsifying agent to be employed in the aqueous emulsion will vary over a considerable range depending upon the particular compound to be polymerized, the amount of water present in the mixture, and the kind and amount of other ingredients added thereto. In general, the amount will vary from .1% to about 10% by weight of the water present in the reaction medium. The preferred amount of the emulsifying agent to be employed will vary between about .5 to 5% by weight of water present.

In the aqueous emulsion polymerization procedure it is sometimes desirable to maintain the emulsion in an acid state, e. g. in a pH of about 1 to 6. This may be accomplished by the use of the proper emulsifying agent that will function effectively in acid medium such as sodium alkyl sulfates or amine salts like lauryl amine hydrochloride and by adjusting the pH with the addition of a strong mineral acid such as hydrochloride, sulfuric or nitric acid.

While any of the above-described catalysts may be utilized as the polymerization catalyst in the aqueous emulsion polymerization process, it is usually preferred to utilize a per-salt catalyst, such as sodium or potassium persulfate. The amount of the catalyst utilized will depend upon the various conditions of reaction but will, in general, vary between about .01% to about 2% of the total reactants.

The amount of the polymerizable mixture to be added to the aqueous emulsion by the preferred method may vary over a considerable range depending upon the nature of the various ingredients and the amount of water present in the emulsion. In most cases it is desirable to maintain the ratio of polymerizable material to water smaller than 1 to 2. When the ratio is larger than about 1 to 2 the emulsion, in some cases, becomes too thick to be handled efficiently and the results are not as satisfactory as desired. The preferred ratio of the polymerizable material to the water in the emulsion mixture varies between about 1 to 3 and 1 to 5.

Temperatures employed during the aqueous emulsion polymerization will, in most cases vary between about 30° C. to about 100° C. with a preferred temperature range being between about 40° C. to 90° C. Atmospheric pressure is usually the preferred pressure to be employed during the polymerization.

The usual reactor for the aqueous emulsion polymerization process is fitted with blades or paddles for keeping the emulsion in a state of agitation during the polymerization process. The reactor may also contain heating or cooling means such as coils for circulating stream or heated oils, or cold water for cooling.

The aqueous emulsion polymerization is particularly efficient when conducted in a continuous manner. In the preferred manner of conducting the reaction the polymerizable material is conducted through a series of distinct reaction zones like separate connected reaction chambers. The flow in the process is such that it continuously advances from chamber to successive chamber without appreciable, or preferably no back flow. The number of reaction zones in series is preferably at least four and may be as many as twenty or higher. Additional polymerizable material is continuously introduced at one or more of the reaction zones other than the first. A more detailed description of a continuous aqueous emulsion polymerization process is found in a co-pending application of William L. J. De Nie, Serial No. 681,681, filed July 6, 1946, now U. S. Patent No. 2,537,334.

The product of the emulsion copolymerization is usually a latex. The copolymers may be recovered from the latex by any suitable means, such as by coagulation with electrolytes or solvents, by freezing, and the like.

The copolymers recovered from the polymerization are white powders, or may be agglomerates of granular materials. On molding the copolymers yield substantially colorless resins possessing a relatively high molecular weight. The resins obtained from the copolymers are characterized by their exceptionally high heat distortion point, their clarity and lack of any color, and improved resistance to organic solvents. The resins may be readily cast into sheets, rods, tubes, and the like of any desired shapes or sizes. They may also be subjected to extrusion and to injection and compression molding in the presence or absence of added diluents. They also may be utilized in the molten or solvent solution in the production of surface coatings and impregnating agents. Because of their exceptionally high heat distortion point they are particularly useful in the production of articles and implements that must be subjected to relatively high heat for relatively long periods of time, such as medical instruments, and the like.

To illustrate the manner in which the invention may be carried out the following examples are given. It is to be understood, however, that the examples are for the purpose of illustration only and they are not to be regarded as limiting the invention in any way.

The heat distortion points shown in the following examples were determined by ASTM test D–648–41–T under the conditions that the test sample was heated in air at one degree per minute.

Example I

A series of polymers were prepared in an aqueous emulsion from the materials listed in the table below. In each case 100 parts of monomer were added to a mixture consisting of 300 parts of water, 1 part of potassium persulfate, and 1 part of sodium lauryl sulfate and the resulting mixture heated to 50° C. The polymers obtained in each case were compression molded under the following conditions: preform preheated for 20 minutes in an oven at 135° C. and then molded at 150° C. and 4000 p. s. i. for 12 minutes. Some of the physical properties of the resulting resins are shown in the following table.

| Material Polymerized, per cent by weight | Heat distortion point | Effect on heating in boiling water |
|---|---|---|
| | °C. | |
| MAN [1] | 90 to 94 | softening and surface blanching. |
| MAN, 70; S, 30 | 88 | Do. |
| MAN, 70; MS, 30 | 107 | no change. |
| MAN, 60; MS, 40 | 107 | Do. |
| MAN, 85; MS, 15 | 103 | Do. |
| MAN, 90; MS, 10 | 102 | Do. |

[1] MAN—methacrylonitrile. S—styrene. MS—alpha-methyl styrene.

Example II

About 70 parts of methacrylonitrile are polymerized with about 30 parts of alpha-methyl chlorostyrene in an aqueous emulsion containing about 400 parts of water, 1 part of benzoyl peroxide, and about 1 part of Turkey-red oil, at a temperature of about 50° C. The resin obtained from the resulting polymer possesses a very high heat distortion point and does not soften nor blanch when added to boiling water for 15 minutes.

Example III

About 85 parts of alpha-ethyl acrylonitrile are polymerized with about 15 parts of alpha-methyl styrene in an aqueous emulsion containing 300 parts of water, 1 part of potassium persulfate and about 1 part of Turkey-red oil, at a temperature of about 50° C. The resin obtained from the resulting polymer possesses a very high heat distortion point and does not soften nor blanch when added to boiling water.

Example IV

The following unsaturated nitriles are polymerized in 70 part portions with 30 parts of alpha-methyl styrene in an aqueous emulsion in the presence of potassium persulfate; alpha-propyl acrylonitrile, alpha-isopropyl acrylonitrile, and alpha(2-chloro-ethyl) acrylonitrile.

We claim as our invention:

1. A copolymer comprising the product of polymerization of a mixture containing 70% by weight of methacrylonitrile and 30% by weight of alpha-methylstyrene, and no other polymerizable component.

2. A copolymer comprising the product of polymerization of a mixture containing 90% to 70% by weight of methacrylonitrile and 10% to 30% by weight of alpha-methylstyrene, and no other polymerizable component.

3. A copolymer comprising the product of polymerization of a mixture containing 70% by weight of methacrylonitrile and 30% by weight of alpha-methyl-chlorostyrene, and no other polymerizable component.

4. A copolymer comprising the product of polymerization of a mixture containing 85% by weight of alpha-ethyl acrylonitrile and 15% by weight of alpha-methylstyrene, and no other polymerizable component.

5. A copolymer comprising the product of polymerization of a mixture containing 90% to 60% by weight of methacrylonitrile and 10% to 40% by weight of alpha-methylstyrene, and no other polymerizable component.

6. A copolymer comprising the product of polymerization of a mixture containing 90% to 70% by weight of methacrylonitrile and 10% to 30% by weight of an alpha-alkyl substituted styrene wherein the alkyl radical on the alpha carbon atom contains from 1 to 3 carbon atoms, and no other polymerizable component.

7. A copolymer comprising the product of polymerization of a mixture containing 90% to 70% by weight of an alpha-alkyl alpha, beta-ethylenically unsaturated nitrile wherein the alkyl radical on the alpha carbon atom contains from 1 to 3 carbon atoms, and 10% to 30% by weight of an alpha-alkyl styrene comprising a styrene molecule wherein the hydrogen atom on the alpha carbon atom of the side chain has been replaced by an alkyl radical containing from 1 to 3 carbon atoms, and containing no other polymerizable component.

8. A copolymer comprising the product of polymerization of a mixture containing 90% to 60% by weight of an alpha-alkyl alpha,beta-ethylenically unsaturated nitrile, and 10% to 40% of an alpha-alkyl substituted styrene comprising a styrene molecule wherein the alpha carbon atom on the side chain is attached to an alkyl radical containing from 1 to 3 carbon atoms and the nuclear carbon atoms are attached to a member of the group consisting of hydrogen and halogen, and containing no other polymerizable component.

MARGUERITE NAPS.
     FRED E. CONDO.

REFERENCES CITED

The following references are of record in the file of this patent:

UNITED STATES PATENTS

| Number | Name | Date |
|---|---|---|
| 1,933,052 | Fikentscher | Oct. 31, 1933 |
| 2,310,961 | Kropa | Feb. 16, 1943 |
| 2,384,543 | Fryling | Sept. 11, 1945 |
| 2,417,293 | D'Alelio | Mar. 11, 1947 |